United States Patent [19]

Lange

[11] 4,070,686
[45] Jan. 24, 1978

[54] CAMERA WITH ADJUSTABLE OBJECTIVE

[75] Inventor: Karl-Heinz Lange, Bunde, Germany

[73] Assignee: Balda-Werke Photographische Gerate & Kunststoff GmbH. & Co. KG, Bunde, Germany

[21] Appl. No.: 752,340

[22] Filed: Dec. 20, 1976

[30] Foreign Application Priority Data

July 17, 1976 Germany .............................. 2632370
Aug. 16, 1976 Germany .............................. 2636795

[51] Int. Cl.$^2$ .......................... G03B 3/00; G03B 13/02
[52] U.S. Cl. ................................... 354/195; 354/221; 354/354
[58] Field of Search ............... 354/195, 174, 198, 199, 354/219, 221, 222, 275, 289, 288, 354

[56] References Cited

U.S. PATENT DOCUMENTS

| 3,798,670 | 3/1974 | Tanaka | 354/195 |
| 3,836,934 | 9/1974 | Suzuki et al. | 354/199 X |
| 3,913,113 | 10/1975 | Yamashita | 354/195 |

FOREIGN PATENT DOCUMENTS

| 1,208,177 | 12/1965 | Germany | 354/195 |
| 2,136,183 | 2/1973 | Germany | 354/195 |

Primary Examiner—Richard A. Wintercorn

Attorney, Agent, or Firm—Blum, Moscovitz, Friedman & Kaplan

[57] ABSTRACT

A camera is provided with an objective supported by a housing of the camera for movement along its optical axis. A movable member is guided by the camera housing for movement transversely with respect to the optical axis, and this movable member has a pair of inclined surfaces. These inclined surfaces are inclined both with respect to the optical axis and with respect to the direction of movement of the movable member. A pair of pressing members respectively press against the inclined surfaces of the movable member, a pair of springs acting on the pair of pressing members for urging them against the inclined surfaces, respectively, so that the latter surfaces are slidable with respect to the pressing members engaging the same. One of these pressing members is fixed to the objective so that when the movable member is moved transversely with respect to the optical axis this one pressing member in cooperation with the inclined surface engaging the same will bring about adjustment of the objective along its optical axis. The arrangement of the pair of inclined surfaces of the movable member is such that at all times, irrespective of the position of the movable member, the spring-pressed pressing members provide equal and opposite forces in the direction of movement of the movable member.

6 Claims, 3 Drawing Figures

U.S. Patent     Jan. 24, 1978     4,070,686
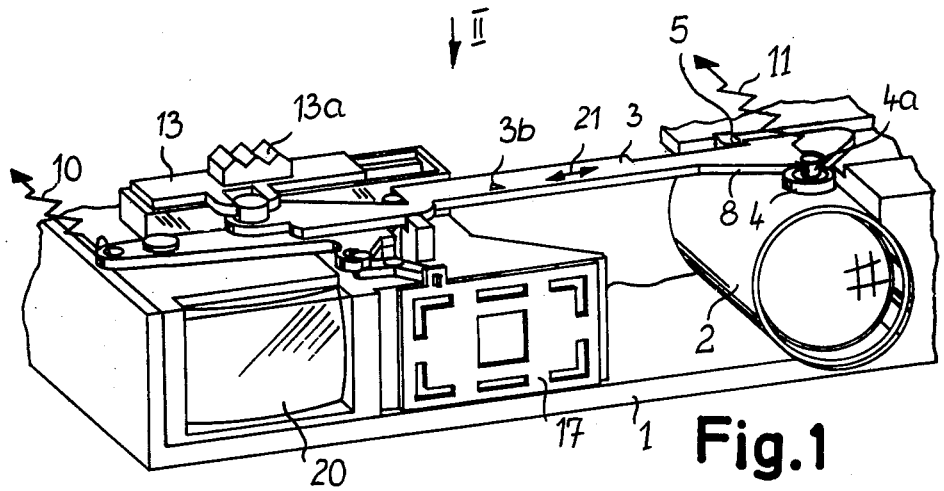
Fig. 1
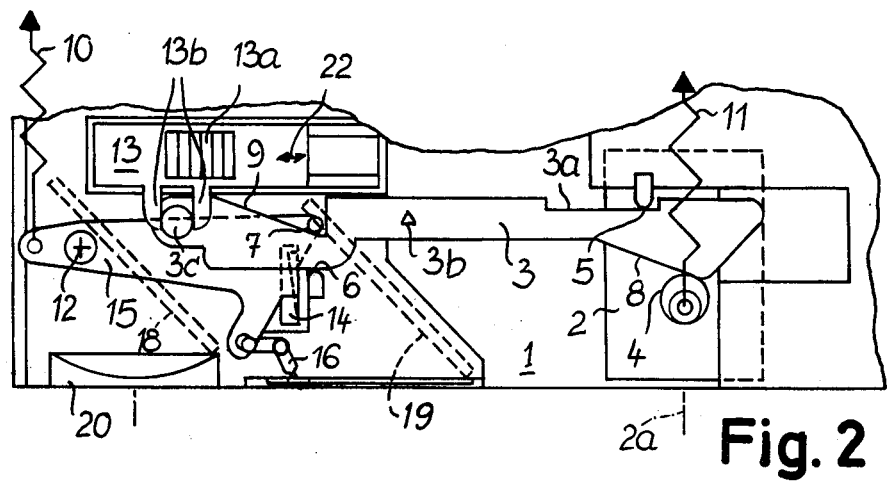
Fig. 2
Fig. 3
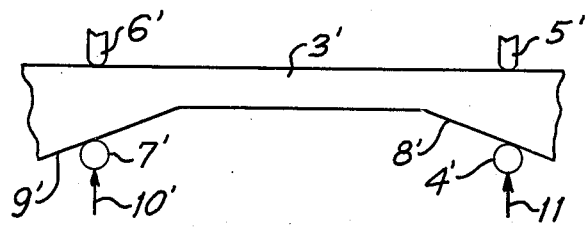

CAMERA WITH ADJUSTABLE OBJECTIVE

BACKGROUND OF THE INVENTION

The present invention relates to cameras.

In particular, the present invention relates to cameras having adjustable objectives.

The present invention relates to that type of device according to which an objective can be moved along its optical axis without play upon movement of an adjusting member which extends transversely with respect to the optical axis and which can be moved with respect to the objective, this movable adjusting member having an inclined surface engaged by a member which is fixed to the objective and which is urged against the inclined surface by a spring.

With a known construction of the above type the pressure with which the member fixed to the objective acts against the inclined surface of the transversely movable member can be resolved into a pair of vectors, one of which acts in the direction of the optical axis and the other of which is perpendicular thereto. The component of this force which is perpendicular to the optical axis seeks to overcome the frictional forces which are encountered and to return the movable objective-adjusting member toward a position where this movable adjusting member is free of forces acting on the same. Such movement is prevented by mounting the movable member in such a way that it is difficult to move so as to assure the presence of sufficiently great forces of friction to hold the movable member in its adjusted position. This requirement of a relatively great friction for the member which is moved to adjust the objective has a considerable disadvantage in that the adjustment of this movable member under certain circumstances can only be carried out in a non-uniform manner because the so-called stick-slip effect is encountered. In other words this movable member in a conventional construction does not slide smoothly and instead tends at one time to stick and then at another time to slip easily, rendering it difficult to provide a precise adjustment of the objective.

SUMMARY OF THE INVENTION

A primary object of the present invention is to provide a construction which will avoid the above drawbacks.

In particular, it is an object of the present invention to provide a structure which is capable of moving an objective smoothly and uniformly back and forth along its optical axis while also providing a smooth uniform movement for the movable member which adjusts the objective.

Also, it is an object of the present invention to provide a construction according to which this movable member which adjusts the objective is at all times acted upon by forces which are substantially in equilibrium.

Thus, it is an object of the present invention to provide for a camera objective the possibility of play-free movement thereof completely without any possibility of sudden, jerking movements, especially by providing at the member which adjusts the objective equal and opposite forces which cancel each other.

It is also an object of the present invention to provide a construction which can achieve the above advantages irrespective of whether the objective-adjusting member is in the region of a central position thereof or in the region of one of its end positions.

Furthermore, it is an object of the present invention to provide a construction according to which part of the structure of the invention can be combined with other camera structure such as, for example, rangefinder structure, paralax-compensating structure, or automatic flash-control structure.

According to the invention the camera has an objective means which is provided with an optical axis and which is guided for movement along its optical axis by a housing means of the camera, this housing means also guiding a movable means for movement transversely with respect to the optical axis. A pair of inclined surface means are connected to and form part of the movable means and a pair of pressing means respectively press against and slidably engage the pair of inclined surface means. A pair of spring means cooperate with the pair of pressing means for pressing the latter against the pair of inclined surface means. One of the pressing means is fixed with the objective means so that when the movable means is moved transversely of the optical axis one of the inclined surface means cooperates with the pressing means fixed to the objective means for adjusting the objective along its optical axis. The pair of inclined surface means cooperate with the pressing means for providing at all positions of the movable means equal and opposite forces in the direction of movement of the movable means, so that the latter is maintained in equilibrium at all of its positions.

BRIEF DESCRIPTION OF DRAWINGS

The invention is illustrated by way of example in the accompanying drawings which form part of this application and in which:

FIG. 1 is a schematic fragmentary perspective illustration of part of a camera provided with the structure of the invention;

FIG. 2 is a fragmentary schematic top plan view of the structure of FIG. 1 as seen in the direction of the arrow II of FIG. 1; and FIG. 3 is a schematic illustration of another embodiment of the invention.

DESCRIPTION OF PREFERRED EMBODIMENTS

Referring to FIGS. 1 and 2, the camera illustrated therein includes a housing means 1 which carries an objective means 2 and which guides the objective means for movement along its optical axis 2a. The objective means 2 carries a pressing means 4 in the form of a circular member which is eccentrically mounted for angular adjustment so as to have its eccentricity adjusted in a known way, this pressing means 4 being formed with an opening through which a pin 4a extends, this pin 4a being fixed to and projecting from the objective means 2. A spring means 11 is operatively connected with the pin 4a, this spring being fixed distant from the pin 4a to a stationary part of the housing 1, so that the spring means 11 acts on the pressing means 4, 4a to urge the objective means 2 rearwardly along its optical axis. Through the spring means 11 the pressing means 4, 4a is urged against an inclined surface means 8 which forms part of a movable means 3 which is guided by the housing means 1 for movement, as shown by the double-headed arrow 21, in opposite directions transversely with respect to the optical axis. Thus, the movable means 3 is guided by the housing means 1 for movement in a direction parallel to the film plane and perpendicular with respect to the optical axis 2a. For the purpose of guiding the movable means 3 the housing means 1 carries a stationary bearing member 5 which has a convex end surface engaging a longitudinal side surface 3a of the movable means 3, this side surface 3a being formed by the inner surface of a notch which is formed along the rear longitudinal edge of the transversely movable objective-adjusting means 3. Thus the member 5 forms a bearing member for the movable means 3 and has a substantially line-contact therewith.

The movable means 3 has a longitudinal side surface opposed to the side surface 3a and engaged by a second bearing member 6 fixedly carried by the housing means 1, and forming a part thereof, this bearing member 6 also having a convex surface engaging a longitudinal side surface of the member 3 so as to have a substantially line-contact therewith. At the side of member 3 which is opposite from the bearing member 6, the member 3 has a second inclined surface means 9 which it will be noted is inclined in the same direction as the inclined surface means 8. A pressing means 7 presses against the inclined surface means 9, this pressing means 7 being in the form of a pin carried by a lever 15 which is supported for turning movement about a stationary pivot pin 12 carried by the camera housing 1, and through the lever 15 a spring means 10 acts on the pressing means 7 to urge the latter into engagement with the inclined surface means 9. This spring means 10 is fixed distant from the lever 15 to a stationary part of the housing 1. Thus, the pair of pressing means 4 and 7 are respectively urged by the pair of spring means 11 and 10 against the pair of inclined surface means 8 and 9 so as to press against the same, while the pair of inclined surface means 8 and 9 are respectively slidable with respect to the pair of pressing means 4 and 7.

The camera housing 1 carries a manually shiftable member 13 having a portion 13a capable of being conveniently engaged by the operator. This member 13 can be moved back and forth by the operator on suitable guides in the directions indicated by the double-headed arrow 22. This manually shiftable member 13 has a pair of fingers 13b defining between themselves a space which receives a pin 3c which is fixed to and projects upwardly from the transversely movable means 3. Thus, when the operator moves the member 13 by engaging the portion 13a thereof, in the direction indicated by the arrow 22, the movable means 3 is moved by engagement of one or the other of the fingers 13b with the pin 3c, so that in this way the movable means 3 is moved to the right or left, as viewed in FIGS. 1 and 2. Thus, the member 13 receives the force exerted by the operator and transmits this force only in one or the other of the directions indicated by the double-headed arrow 22, so that only horizontal forces are transmitted from the member 13 to the movable means 3.

Of course, the movable means 3 is urged against the bearing member 5 by the spring-pressed pin 4, and since the pin 4 is out of line with the bearing member 5 it seeks to turn the member 3 about the member 5 in a counterclockwise direction, as viewed in FIG. 2, thus pressing the movable means 3 against the guide member 6. This force with which the movable means 3 is urged against the bearing member 6 by way of the action of members 4 and 5 is augmented by the force of the spring 10 acting on the pin or pressing member 7. Thus this member 7 also seeks to press the member 3 against both of the bearing members 5 and 6.

As a result of the force provided at the pressing means 4 by way of the spring 11, this pressing means 4 cooperates with the inclined surface means 8 to tend to urge the movable means 3 toward the right, as viewed in FIGS. 1 and 2. However, the spring 10 acts through the lever 15, swingable on the pivot pin 12, to provide at the pressing means 7 on the inclined surface means 9 a force which urges the movable means 3 toward the left, as viewed in FIGS. 1 and 2. Because the pair of inclined surface means 8 and 9 have the same inclination, being parallel to each other, by suitable selection of the spring forces, the components of force which are opposite to each other and which are perpendicular to the optical axis 2a are equal to each other. Thus, the movable means 3 will be in equilibrium in all of its positions.

In the example illustrated the lever 15 is operatively connected with a wedge-shaped lens 14 utilized for range-finder purposes. Moreover, the lever 15 acts through a lever 16 on a framing member 17 which has openings shaped as shown in FIG. 1 to provide in a known way in the field of the viewfinder an image of the frame in which the viewed image will be photographed. The viewfinder lens 20 is also shown in FIGS. 1 and 2 as well as the mirror or reflector 19 and the semi-transparent reflector or mirror 18.

It will be noted that the movable means 3 carries an index 3b. This index is movable along an unillustrated scale indicating the distance between the object to be photographed and the camera.

Of course, certain variations are possible. Thus there is schematically shown in FIG. 3 an embodiment according to which the movable means 3' corresponding to the means 3 has one longitudinal side surface engaging a pair of bearing members 5' and 6' respectively corresponding to the bearing members 5 and 6. At its opposite longitudinal side surface the movable means 3' of FIG. 3 is provided with a pair of inclined surface means 8' and 9' which it will be noted are oppositely inclined. The pair of pressing means 4' and 7', corresponding respectively to the pair of pressing means 4 and 7, press against the pair of inclined surface means 8' and 9'. FIG. 3 schematically illustrates a spring means 10' acting on the pressing means 7' for urging the latter against the inclined surface means 9' as well as a spring means 11' acting on the pin means 4' for urging the latter against the inclined surface means 8'. Of course, the pin means 4' of FIG. 3 is fixed to the objective while the pin means 7' can be carried by a swingable lever which is acted upon by a spring in the same way as in FIG. 2. Thus it will be seen that the embodiment of FIG. 3 also can achieve the results of the invention inasmuch as the forces with which the members 7' and 4' are urged against the inclined surfaces 9' and 8' can be resolved into components which include components directed respectively to the left and right as viewed in FIG. 3, the arrangement being such that these latter oppositely directed components are equal to each other at all times, thus achieving in this way the results set forth above.

It is thus apparent that with the structure of the invention it is possible to achieve for the objective a smooth movement free of any play. With the known construction having only one inclined surface and only one spring urging a pin into engagement with this one inclined surface, the force required to adjust the objective will vary with different adjusting directions. In one direction of adjustment it is necessary to tension the spring as well as to overcome the forces of friction. In the opposite direction of adjustment the force stored in the spring will itself contribute to overcoming the friction force, so that uniformity in both directions of adjustment cannot be achieved with a conventional construction, whereas such uniformity is indeed achieved with the structure of the invention.

Thus, in contrast with the above conventional construction, with the structure of the invention the movable means is in all of its positions in a condition of equilibrium. The same force is required to move the movable means in one direction as in the opposite direction. Moreover the magnitude of the adjusting force remains practically the same at all positions of adjustment. It is immaterial whether the movable means 3 is at a central position or at the region of one of its end positions.

Of course, it is of advantage to utilize the lever 15 not only for transmitting the spring force of the spring 10 to the pressing means 7 but also to actuate other components such as those utilized in connection with range-finding, parallax compensation, or operation of a component such as the diaphragm of a flash device.

What is claimed is:

1. In a camera, objective means having an optical axis, housing means guiding said objective means for movement along said optical axis thereof, movable means guided by said housing means transversely with respect to said optical axis, a pair of inclined surface means connected with and forming part of said movable means and each being inclined both with respect to the direction of movement of said movable means and with respect to said optical axis, a pair of pressing means respectively pressing against and slidably engaging said pair of inclined surface means, one of said pressing means being fixed to said objective means, and a pair of spring means respectively connected operatively with said pair of pressing means for respectively urging the latter against said pair of inclined surface means, said movable means when moved transversely with respect to said optical axis acting through one of said inclined surface means on said one pressing means which is fixed to said objective means for moving the latter along said optical axis, and said pair of inclined surface means respectively cooperating with said pair of pressing means for providing at all positions of said movable means equal and opposite forces in the direction of movement of said movable means.

2. The combination of claim 1 and wherein, for guiding said movable means, said housing means carries a pair of bearing members which are stationary with respect to said housing means and with respect to said movable means, said movable means slidably engaging said bearing members to be guided thereby.

3. The combination of claim 2 and wherein said movable means is of an elongated configuration and in its longitudinal direction extends transversely with respect to said optical axis, said movable means having a pair of opposed longitudinal side surfaces, and said pair of bearing members respectively engaging said pair of opposed longitudinal side surfaces of said movable means, said pair of inclined surface means being inclined in the same direction and also being respectively situated in the region of said opposed longitudinal side surfaces of said movable means.

4. The combination of claim 2 and wherein said movable means is of an elongated configuration and in its longitudinal direction extends transversely with respect to said optical axis, said movable means having a pair of opposed longitudinal side surfaces, and said pair of bearing members both engaging one of said longitudinal side surfaces of said movable means, said pair of inclined surface means respectively being oppositely inclined and both being situated at the region of the other of said longitudinal side surfaces of said movable means.

5. The combination of claim 1 and wherein a lever is swingably carried by said housing means, said lever carrying the other of said pressing means.

6. The combination of claim 5 and wherein said lever forms part of said spring means which acts on said other pressing means, the latter spring means including a spring connected directly to said lever for acting through the latter on said other pressing means.

* * * * *